Jan. 23, 1973   P. G. ISBERG ET AL   3,712,851
NUCLEAR POWER STATION
Filed March 27, 1969   12 Sheets-Sheet 1
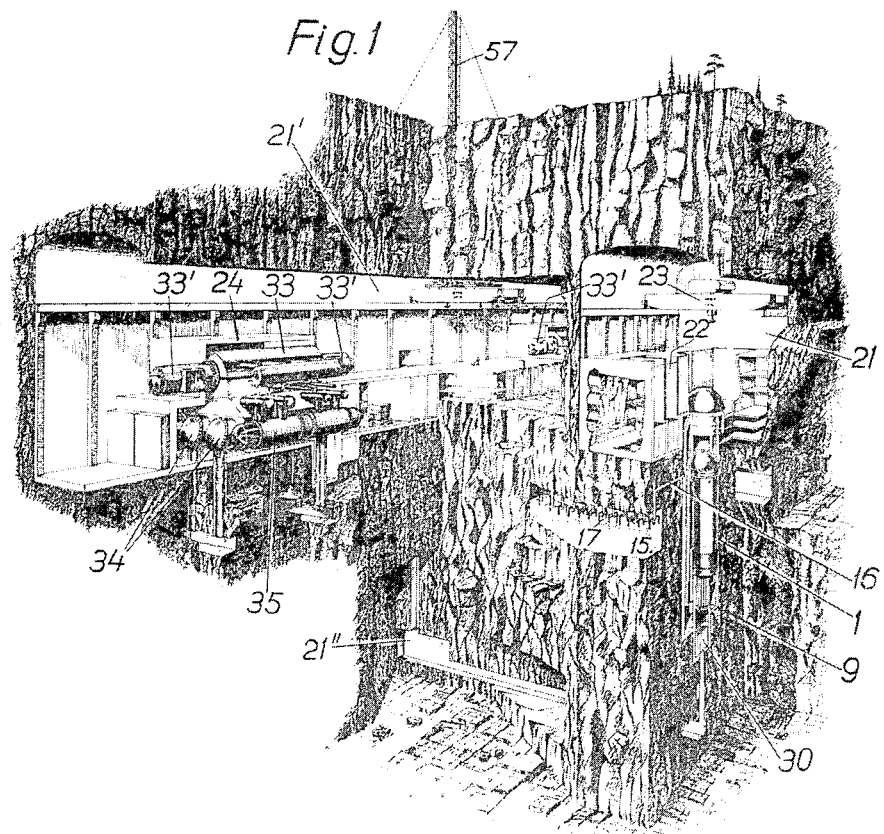
INVENTORS
PER GUSTAF ISBERG
CHRISTEN WILLEMOES PIND
KNUT HERBERT SUNDQVIST
BY

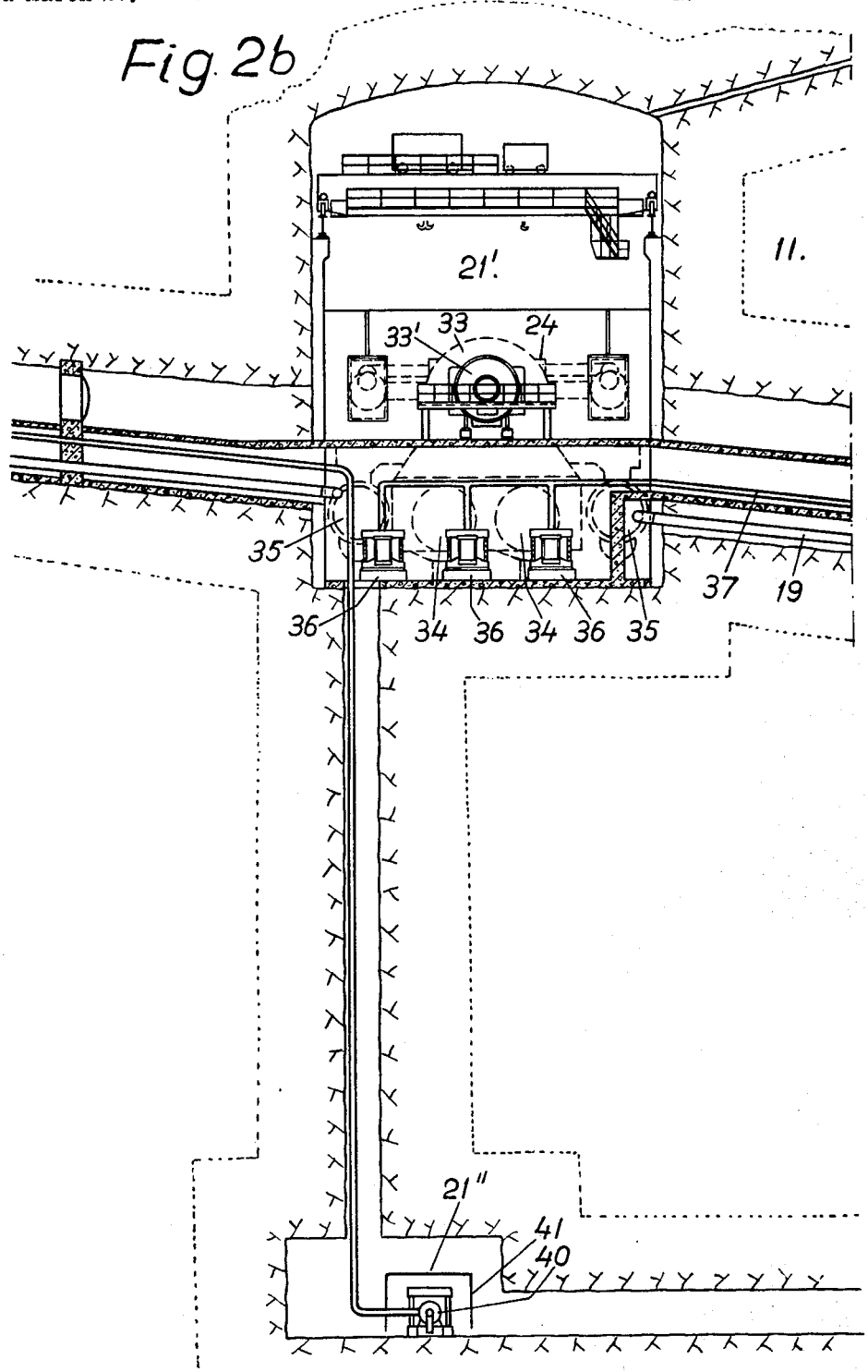

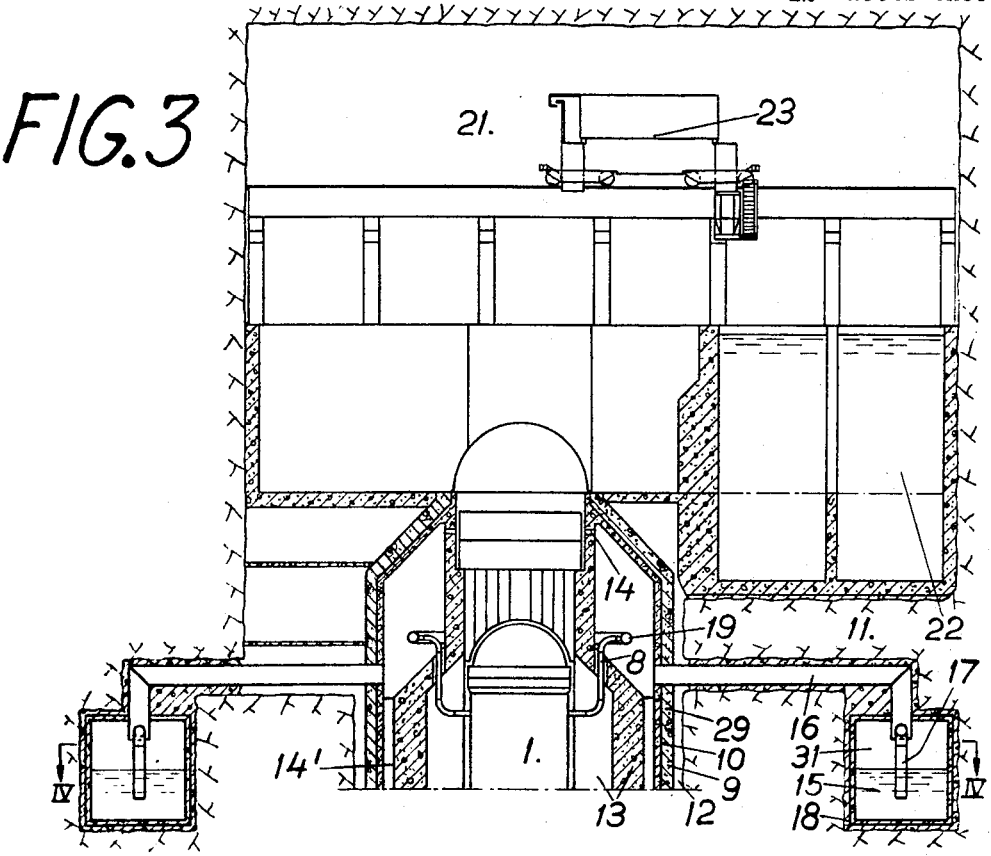
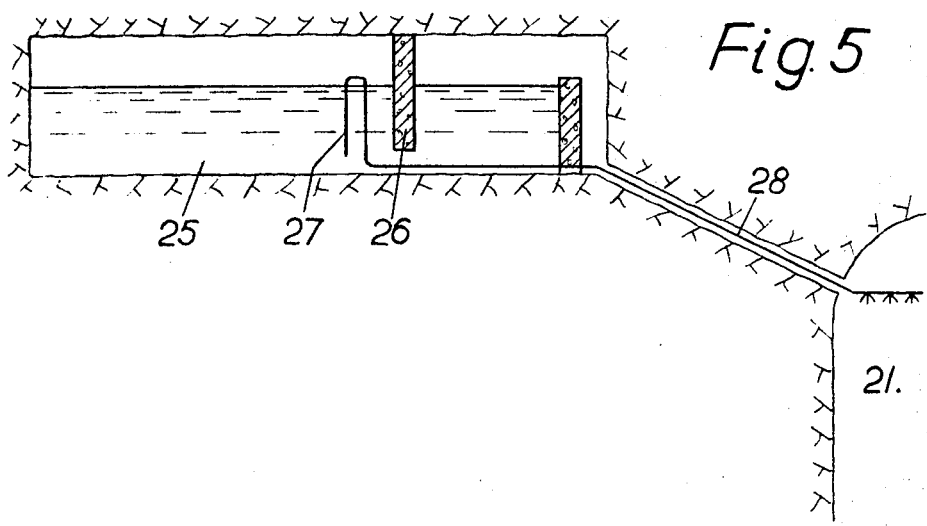

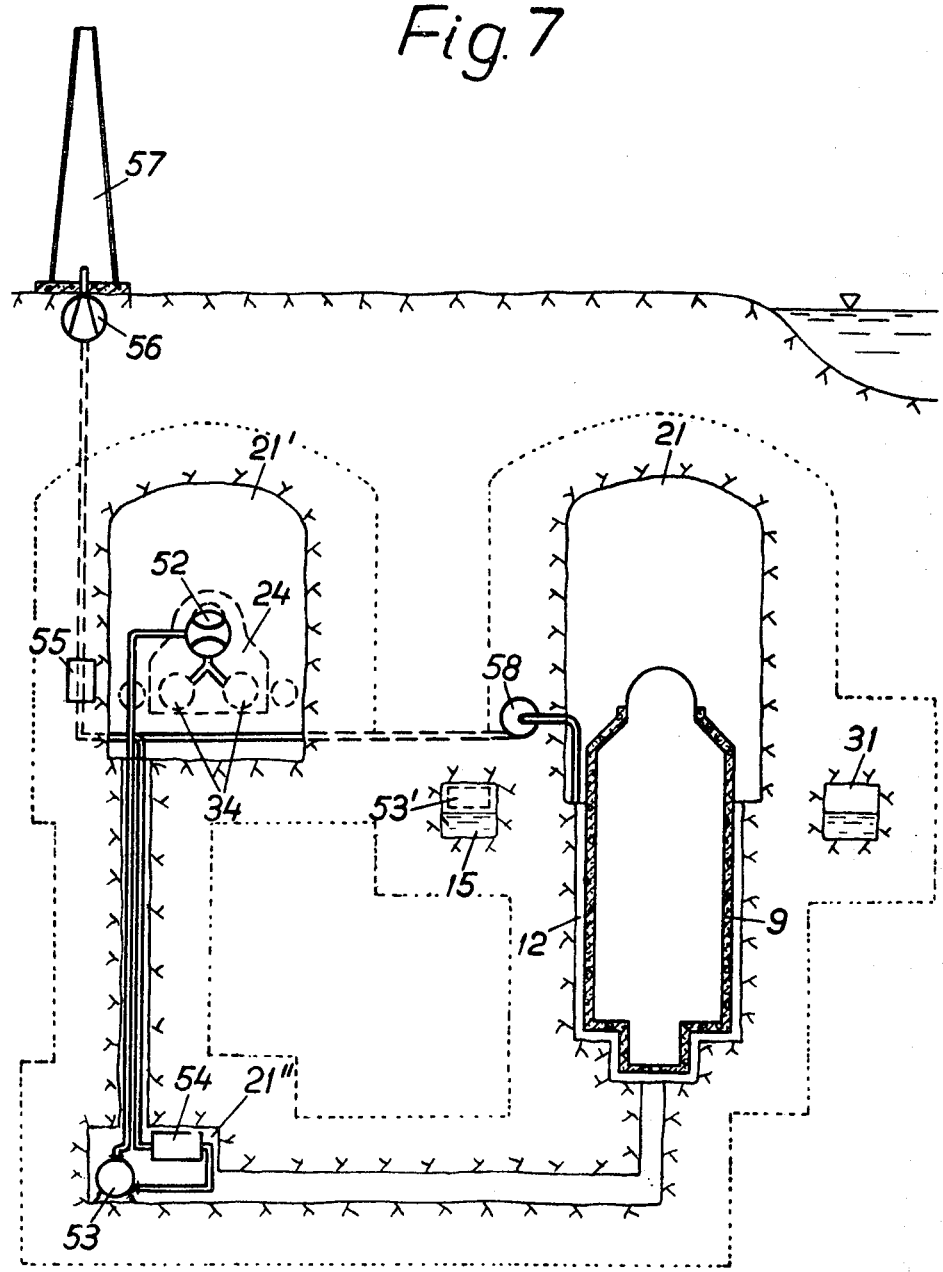

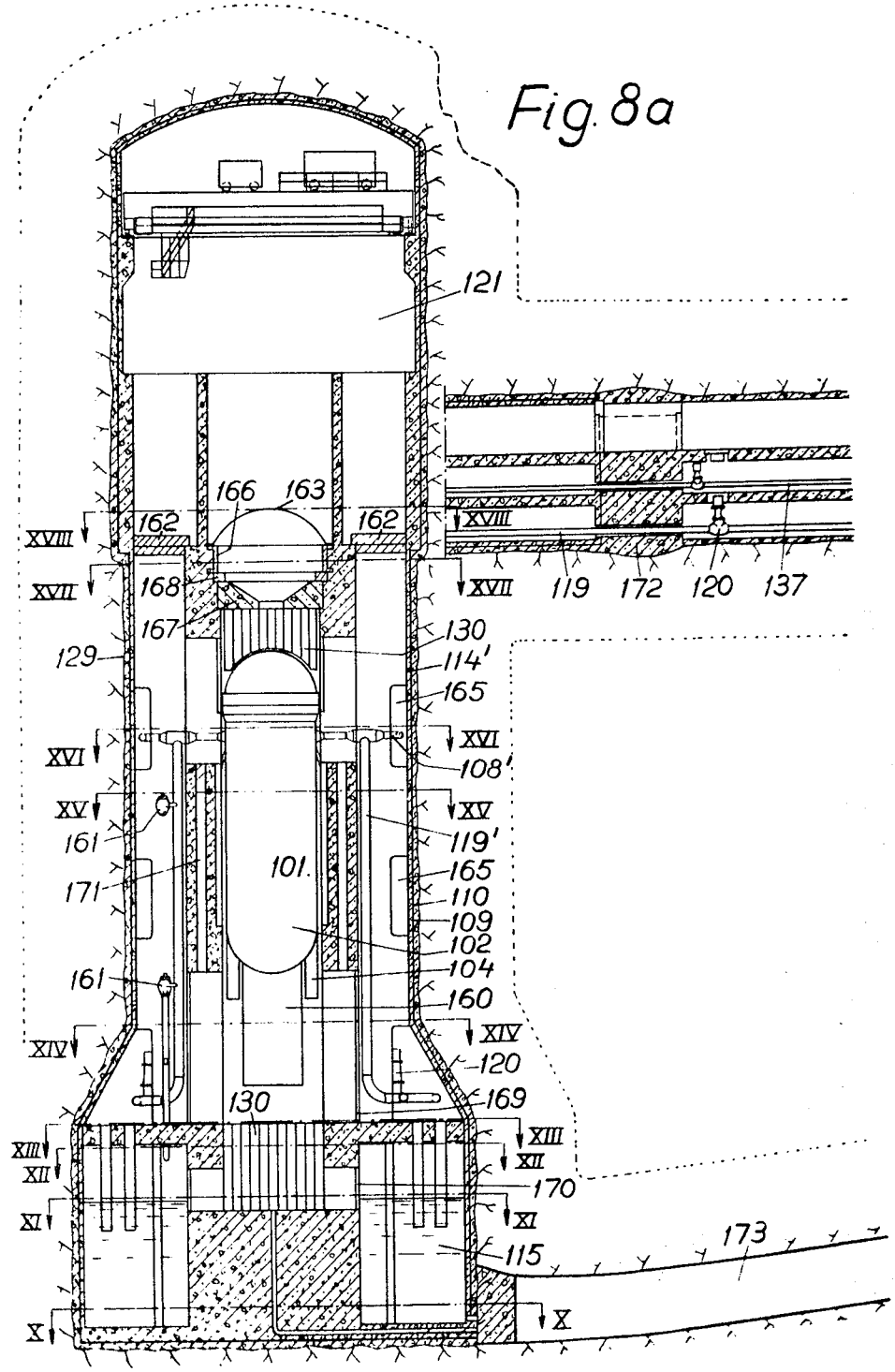

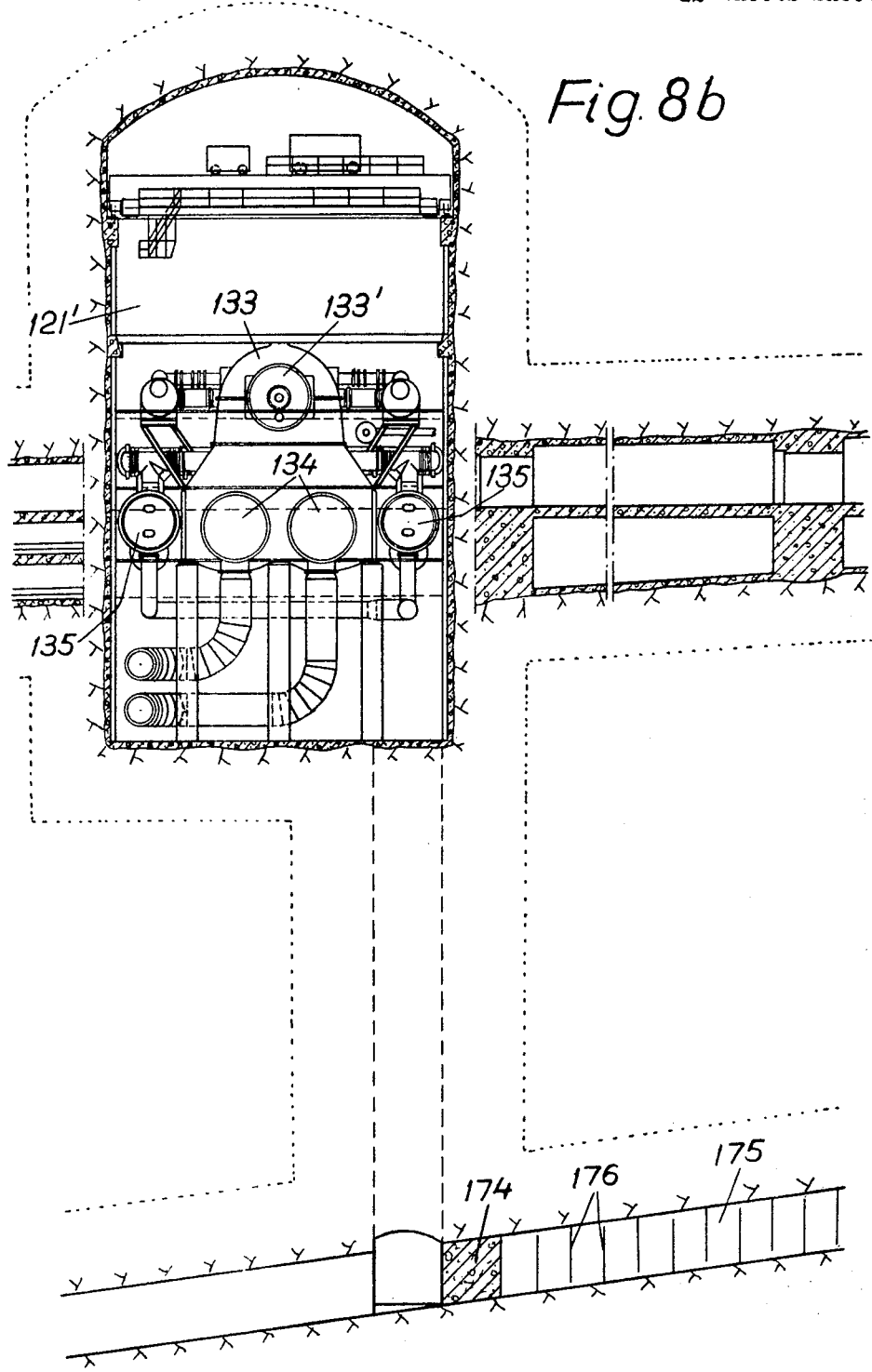

Jan. 23, 1973   P. G. ISBERG ET AL   3,712,851
NUCLEAR POWER STATION

Filed March 27, 1969   12 Sheets-Sheet 11

INVENTOR.
PER GUSTAF ISBERG
CHRISTEN WILLEMOES PIND
BY CNUT HERBERT SUNDQVIST

Jennings Bailey, Jr

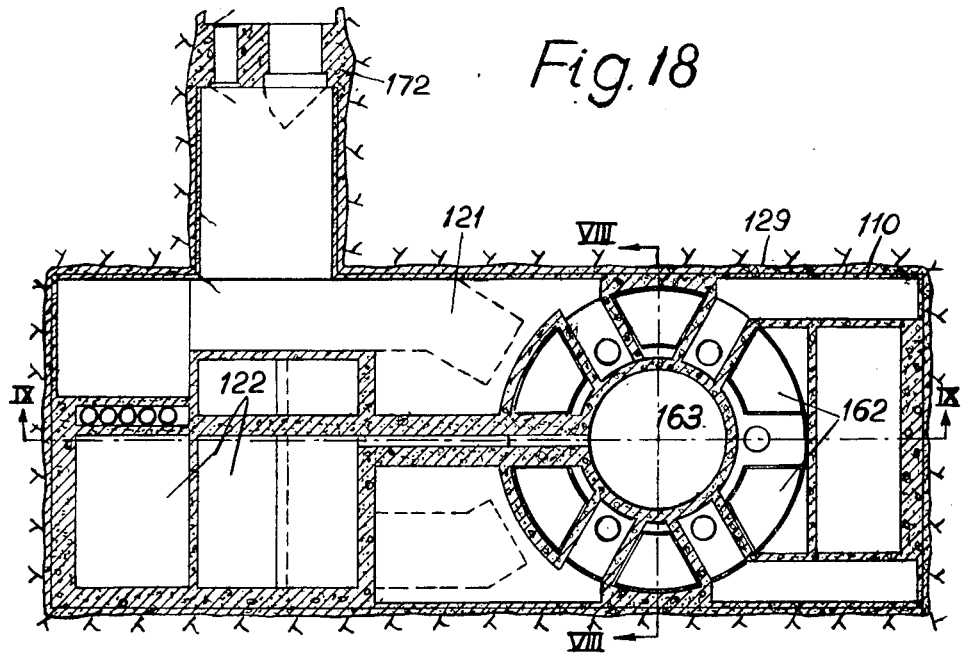
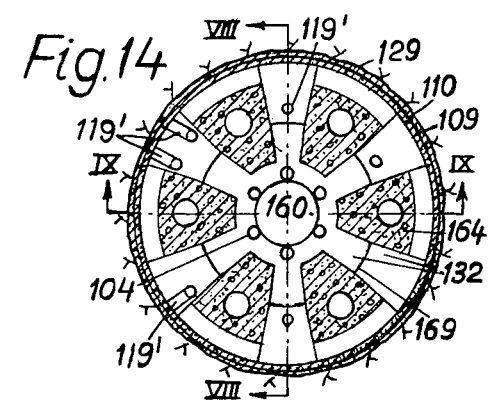
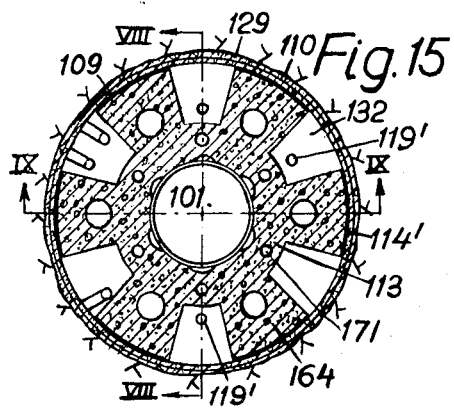
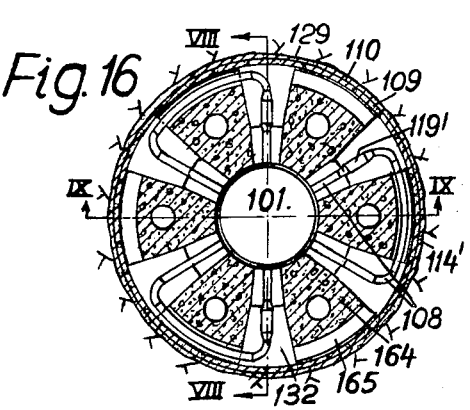
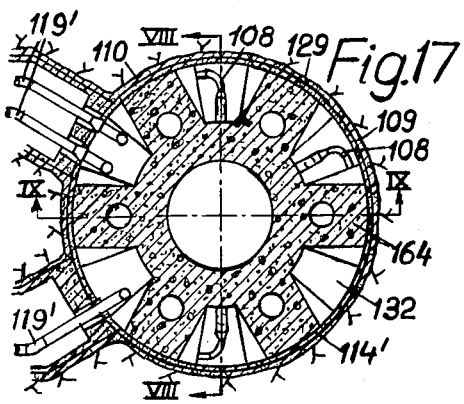

United States Patent Office 3,712,851
Patented Jan. 23, 1973

3,712,851
NUCLEAR POWER STATION
Per Gustaf Isberg, Christen Willemoes Pind, and Cnut Herbert Sundqvist, Vasteras, Sweden, assignors to Allmanna Svenska Elektriska Aktiebolaget, Vasteras, Sweden
Filed Mar. 27, 1969, Ser. No. 811,123
Claims priority, application Sweden, Mar. 28, 1968, 4,118/68
Int. Cl. G21c 9/00
U.S. Cl. 176—37
24 Claims

ABSTRACT OF THE DISCLOSURE

A nuclear power station for location in heavily populated areas has a nuclear reactor which is surrounded by a conventional containment vessel. The containment vessel is located in a rock cavern forming a secondary containment and is supported from beneath and laterally by the floor and the walls of the rock cavern. The rock cavern is reinforced and made tight by injection of grout and a third containment is formed by the surrounding ground water which may be provided artificially. A pressure transmitting, missile protecting and non-leaktight shield is provided between the reactor and the primary containment so that the reactor is indirectly supported by the rock chamber walls.

BACKGROUND OF THE INVENTION (1) Field of the invention

This invention relates to a nuclear power station comprising at least one nuclear reactor having a reactor pressure vessel, a primary reactor system comprising said reactor pressure vessel and at least one circuit connected to said pressure vessel and containing reactor cooling medium, and a primary containment vessel having a side wall, said primary containment vessel enclosing said reactor and at least part of said primary system.

(2) The prior art

A nuclear power station here includes the following equipment:

(1) At least one nuclear reactor having a pressure vessel called the reactor vessel with connected circuits which, like the reactor vessel, are during operation filled with a coolant, preferably water or steam or both. The nuclear reactor also contains nuclear fuel consisting of uranium, thorium or plutonium in the form of metals or compounds with oxygen, carbon or some other suitable element. The nuclear fuel is arranged preferably in the form of rod-like bodies, suitably canned in metal, which are surrounded by the above-mentioned coolant. The encased fuel rods are arranged parallel to each other in the reactor core and during operation emit heat to the coolant.

(2) A primary system comprising the reactor pressure vessel and circuits connected to this vessel which enclose the coolant for the reactor. The primary system may include one or more heat exchangers to transmit thermal energy to a secondary heat exchanging system or one or more turbogenerators with condensing means, or both.

(3) The equipment required to operate the nuclear reactor, turbines and heat exchangers.

(4) At least one building in which the nuclear reactor, turbines, heat exchangers and the equipment necessary for their operation are housed.

In nuclear reactors considerable quantites of radioactive substances are generated during operation, the radiation emitted being dangerous for living organisms. These radioactive substances, which are formed especially in the nuclear fuel itself, are called fission products. Normally they are prevented by the fuel element canning from leaving the element but if certain faults or accidents occur they may leak out and also be spread further. One object of the invention is to improve the protection against such spreading on the occurrence of a number of faults and accidents in the station, in a manner to be described in the following.

If holes appear in the cannings of one or more fuel elements volatile fission products will escape through these and mix with the surrounding coolant. Especially substances of the types of inert gas, halogens and alkali metals are concerned. In most types of nuclear reactors the fission products remain substantially in the coolant and have a concentration determined by the rate of flow from the holes in the fuel elements in relation to the disintegration rate of the fission products and the size and effectiveness of the purifying system for the coolant. However, fission products are transported further through leaks in the primary system to the immediate surroundings of the reactor.

In so-called direct cycle boilers where the coolant is water which boils around the fuel elements and where the steam condenses in at least one turbine condensor or other heat exchanger, the inert gases are removed from the reactor while usually the other fission products which have leaked out from the fuel element mostly remain in the water phase of the coolant in the reactor. The inert gases which have leaked from the direct cycle boiler to the condensor are released to the surroundings after the activity has been reduced for a longer or shorter time in an exhaust system.

If the delay period is long, in order, at a certain fuel leakage rate, to keep the quantity released to the surroundings low, or, at a given permissible release, permit the greatest possible leakage of fuel, the radioactivity of the delaying part of the exhaust system can become high. It must be extremely carefully radiation shielded and, if a fault arises in the exhaust system, considerable quantities of radioactive exhaust gases may be released.

Fission products may also be released from the reactor upon an accident in the station. Examples of such accidents are:

(1) Damage to many fuel elements simultaneously during operation or during refuelling caused by a so-called reactivity accident inside the reactor.

(2) A rupture in the primary system of the reactor which may cause fission products which have already leaked out to the coolant during normal operation, to leave the nuclear reactor and also may cause fission products which, when the rupture occurred, were still in the fuel, to be released if this fuel should be damaged mechanically or due to over-heating as a result of the accident.

In order to reduce the consequences of such accidents a nuclear reactor and its primary system or parts of it are therefore often enclosed in a tight so-called containment vessel, here called the primary containment vesel of the station. If the primary system extends outside the primary containment vessel the circuits are provided at their entry points with at least one so-called isolation valve. These close automatically at an accident signal in the station, except in so far as coolant is supplied to the reactor and containment vessel or both. Thus the primary containment vessel, which has been previously tested as to tightness, as have also the isolation valves, is sealed against leakage of any fission products which have been released from the nuclear reactor during the accident.

The primary containment vessel is often provided with a condensing system, often called "pressure suppression system" where steam which is liberated from the nuclear reactor immediately after an accident in the form of a rupture in the primary system is condensed. This makes it possible for a specific nuclear reactor to use a smaller primary containment vessel with a given design pressure for the vessel or a lower design pressure at a given volume of the primary containment vessel. The condensing system may contain, for example water, ice, stones or balls as condensing medium.

The primary containment vessel is also often provided with a sprinkling system which condenses steam remaining in the vessel or coming out of the vessel after the first condensation. The sprinkling system sprinkles water through the gas space of the primary containment vessel and conducts the water through an outer system with pumps and heat exchangers, with the help of which the thermal energy which has escaped from the primary containment at the time of the accident and the energy which continues to escape from the reactor into the containment after the accident is carried away to an outer heat sink. If the thermal power released into the primary containment vessel after the accident is greater than the cooling effect of the sprinkling system, the condensing system continues to operate in parallel with the sprinkling system. This is particularly the case if chemical-reaction energy from a reaction between canning metal and steam in the nuclear reactor is added to the reactor's after-power which is generated by fission products in the nuclear fuel.

A rupture in the primary system inside the primary containment vessel itself is here called an internal rupture. A rupture in the primary system outside the primary containment vessel is here called an external rupture. Upon an external rupture as much of the reactor coolant will escape to the surroundings of the primary containment vessel as has time to flow out through the ruptured part before the isolation valve is shut. After an internal rupture an over-pressure will remain for some time in the primary containment vessel and a certain leakage of fission products may then take place through leaks in the walls of the primary containment vessel and the sealing members of the isolation valves. After a reactivity accident the remaining pressure of the reactor may force fission products out of the primary containment vessel through the sealing members of the isolation valves.

In known nuclear reactor plants those quantities of fission products which, after the accidents described, escape from the containment vessel, will spread to the surroundings of the plant, whether the containment vessel is a pressure vessel above ground or a rock cavern as in the Ågesta plant (see Nuclear Power, March 1963). The surrounding buildings are subjected to the influence of the wind and a certain leakage may therefore be assumed to occur from them due to suction on the leeward sides of the buildings. Thus a certain under-pressure is aimed at in the buildings by means of suction to the chimney of the plant and by filtering the air sucked out. However, inert gases and, to a certain extent, also other fission products will go through the filters.

Upon large external ruptures in said plants, furthermore, the building where the accident has occurred will be damaged by the over-pressure arising and an immediate release to the surroundings will thus also occur. It is economically and technically difficult to build buildings of the size in question in such a way that they are strong and sufficiently tight to prevent a large immediate leakage from developing.

Previously efforts have been made to improve the safety of the nuclear reactor plant by various types of double containments, which have all been aimed at doubling the primary containment vessel and thus improving its tightness.

SUMMARY OF THE DISCLOSURE

The present invention relates to a nuclear power station which can be sited in extremely densely populated areas without risk of an impermissibly great radioactive discharge if an accident occurs.

One main object of the invention is to provide a nuclear power station in which the primary containment vessel and those parts of the primary system lying outside this containment are enclosed in a large secondary containment vessel which can be given sufficient tightness against leakage and which, upon an inner rupture, takes up the gas pressure and possible shock forces which may operate on the side walls of the primary containment.

This is achieved by surrounding the primary containment vessel with a secondary containment vessel comprising a rock chamber and by a side wall of the primary containment vessel being supported by a side wall of the rock chamber.

In a preferred embodiment the rock chamber is arranged to comprise a primary containment vessel for a heat exchanger, for example a condensor for a main turbine, included in the primary system.

Locating nuclear reactors in rock chambers is in itself not new. However, in no case is the rock used for the purpose of providing a secondary containment vessel in the manner indicated here. For example, the reactor R1 in Stockholm has no tight containment at all and in the Ågesta plant in Stockholm the rock cavern forms the primary containment vessel and in the rock vessel reactor described in Swedish patent specifications Nos. 170,381 and 173,096 the rock cavern forms the reactor pressure vessel. As far as is known, the rock is not used in any previous nuclear power station to take up shock forces on the occurrence of an accident, but only to take up gas pressure.

When the rock is used as a secondary containment vessel, there is far less demand for tightness than when, as in Ågesta, it is used as primary containment vessel. It can probably often be used as it is but may also be sealed by injecting in cement grout, for example, or a slurry of fine-grained clay. The requirements for tightness in airlocks in access routes and valves in the ventilation system are also considerably less for a secondary containment vessel than for a primary containment vessel.

Upon an external rupture no immediate discharge will occur to the surroundings of the station. Instead, the pressure in the rock cavern increases to a certain level and the rock above must of course be sufficient not to be lifted by this pressure. Since no after-power is generated in the secondary containment, however, this pressure is quickly reduced by sprinkling the gas volume of the rock chamber with water. This sprinkling may be carried out by pumps, but it may also be carried out by hydrostatic pressure from basins or other water pools situated at a higher level than the rock cavern. Sprinkling can be started by opening valves or automatically by the over-pressure arising. In the latter case the pressure which arises can be used to flood a siphon in the sprinkling system so that sprinkling is started and continues until the basin is empty or as long as it is refilled.

If the sprinkling system is given a capacity of some hundred kg./s., the pressure can be reduced approximately linearly in, at the most, 10–20 minutes. If the secondary containment vessel leaks, for example 10 m.$^3$ normal volume per second and bar over-pressure, then at a starting pressure of 2.5 bar a leakage of gas mixture will occur to the surroundings which is, at the most, some percent of the total volume of the secondary containment vessel. The leakage of fission products can therefore be kept to a small fraction of the discharge which would occur with normal buildings situated above ground. The absorption of fission products into the rock crevices further decreases the discharge to the plant surroundings. An additional reduction of the leakage can be achieved by placing the rock cavern below the ground water level, which must possibly be kept constant artificially. Thus the ground water will provide a third containment.

With a direct cycle boiler, by situating the nuclear reactor and its primary containment vessel in one rock cavern and the condensors in another rock cavern, separate from the first, it is possible more rapidly to condense the greater part of the steam which is released to the secondary containment vessel after an external rupture. The two rock caverns are then poined by means of a condensing system, preferably one with ice, stones or balls as condensing medium. In this case, upon an external rupture in one rock cavern the other rock cavern is used as a collection space for the gases blowing through which are not condensable, and vice versa, and no special collecting space is required.

After an internal rupture, as mentioned earlier, an inner over-pressure prevails for some time in the primary containment vessel, and it may therefore be presumed that a certain leakage will occur of hot gas or steam or both, together with fission products. The quantity of heat carried out to the secondary containment vessel is small, however, and can be taken care of by a reasonable flow of sprinkling which, in this case may possibly be circulated back to the water supply through heat exchangers. Over-pressure can thus be avoided in this case in the secondary containment vessel and, since it is not subjected to wind suction, the discharge to the surroundings of the plant can be kept very low. No extreme tightness of the rock cavern walls is required in this case either.

Sprinkling of the secondary containment vessel may possibly be limited to one of perhaps several communicating rock caverns. This makes it easier to design the station in such a way that the sprinkler pumps of the primary containment vessel are not flooded during the long sprinkling period in this case.

The location of a nuclear reactor station in a secondary containment vessel in the form of a rock cavern has also other, unexploited possibilities of increasing the safety of the station.

One of these is that the condensation system of the primary containment vessel can be situated in a separate rock cavern and that its over-pressure upon an accident can be taken up directly in the rock, and that the system can be situated at a higher level than the reactor core, an arrangement which is in practice difficult to perform in stations which are above ground. This means that the containment vessel can be flooded to a level above the reactor core, thus ensuring cooling of the core after an internal rupture without previously flooding the condensation system and thus putting it out of operation. As described earlier, such operation may be required when the core is insufficiently cooled, particularly when chemical reactions take place in the core between the canning metal and steam.

Another advantage of enclosing the reactor and its primary containment vessel in a secondary containment vessel in the form of a rock cavern is that the reaction forces which may arise after large ruptures in the primary system can be transmitted to the rock and that the tightness of the primary containment vessel can be maintained even after serious ruptures in the primary system, which this containment vessel cannot normally be made to withstand.

In this case the reactor is radially surrounded by a concrete shield which, due to an expansion joint, has a certain axial and radial margin of free motion in relation to the primary containment vessel, which is in turn supported by the rock. The concrete shield may also be designed to form a radiation shield between the reactor and the part of the primary containment vessel where work is often carried out. It may also be designed to provide a pressure-absorbing, but not tight, shield between the reactor and the primary containment vessel and can thus protect the primary containment vessel against damages due to missiles and high over-pressure in the initial stage after a serious rupture in the primary system. In a preferred embodiment the shield has at least substantially the shape of a hollow cylinder with axial slots. It is particularly advantageous to design the shield with radial openings and at least one annular peripheral channel to prevent the build-up of shock waves by reflection.

Additional protection for the primary containment vessel can be obtained by positioning deformable shock absorbers above and below the reactor where immediate support against the rock cannot be obtained. Furthermore, the fuel basin of the station, which weighs several thousand tons, can be placed above the primary containment vessel in such a way that it contributes to preventing the primary containment vessel from being subjected to too great axial stresses upon a rupture of the reactor pressure vessel.

Yet another advantage of placing a nuclear reactor and its primary containment vessel in a secondary containment vessel in the form of a rock cavern is that a pressure-carrying and relatively tight enclosure of the reactor is obtained even in those cases when the primary containment vessel possibly might be damaged after an accident or when it is opened, for example for refuelling.

Another advantage of enclosing a nuclear reactor and its primary containment vessel in a secondary containment vessel in the form of a rock cavern is that safety systems such as the sprinkling pumps in the sprinkling system for the primary containment vessel can be situated in the secondary containment vessel but in separate rock chambers and in such a way that they are not flooded and put out of operation by the sprinkling water for the secondary containment vessel.

Another advantage of enclosing the nuclear reactor with its primary containment in a secondary containment vessel in the form of a rock cavern is that the previously-mentioned delaying part of the off-gas system in direct cycle boilers can be enclosed and radiation-protected in the rock. Also other, naturally radiation-protected spaces, for example the gas-filled part of the condensing system, can be used as expansion vessel for the radioactive gas released if the delaying part should cease to function, for example due to fault in its cooling system.

BRIEF DESCRIPTION OF THE DRAWINGS

In the following the invention will be described with reference to the accompanying drawings. FIG. 1 shows in perspective a vertical section through an embodiment of a nuclear power station according to the invention. FIGS. 2a and 2b show in vertical section the underground parts of the nuclear power station according to FIG. 1. FIG. 3 shows the section III—III in FIG. 2 FIG. 5 shows a vertical section through a part of a system for the supply for sprinkling water to the rock cavern. FIGS. 8a and 8b show in vertical section the underground parts of another embodiment of the nuclear reactor station.

DESCRIPTION OF THE PREFERRED EMBODIMENTS

Figure 2A:
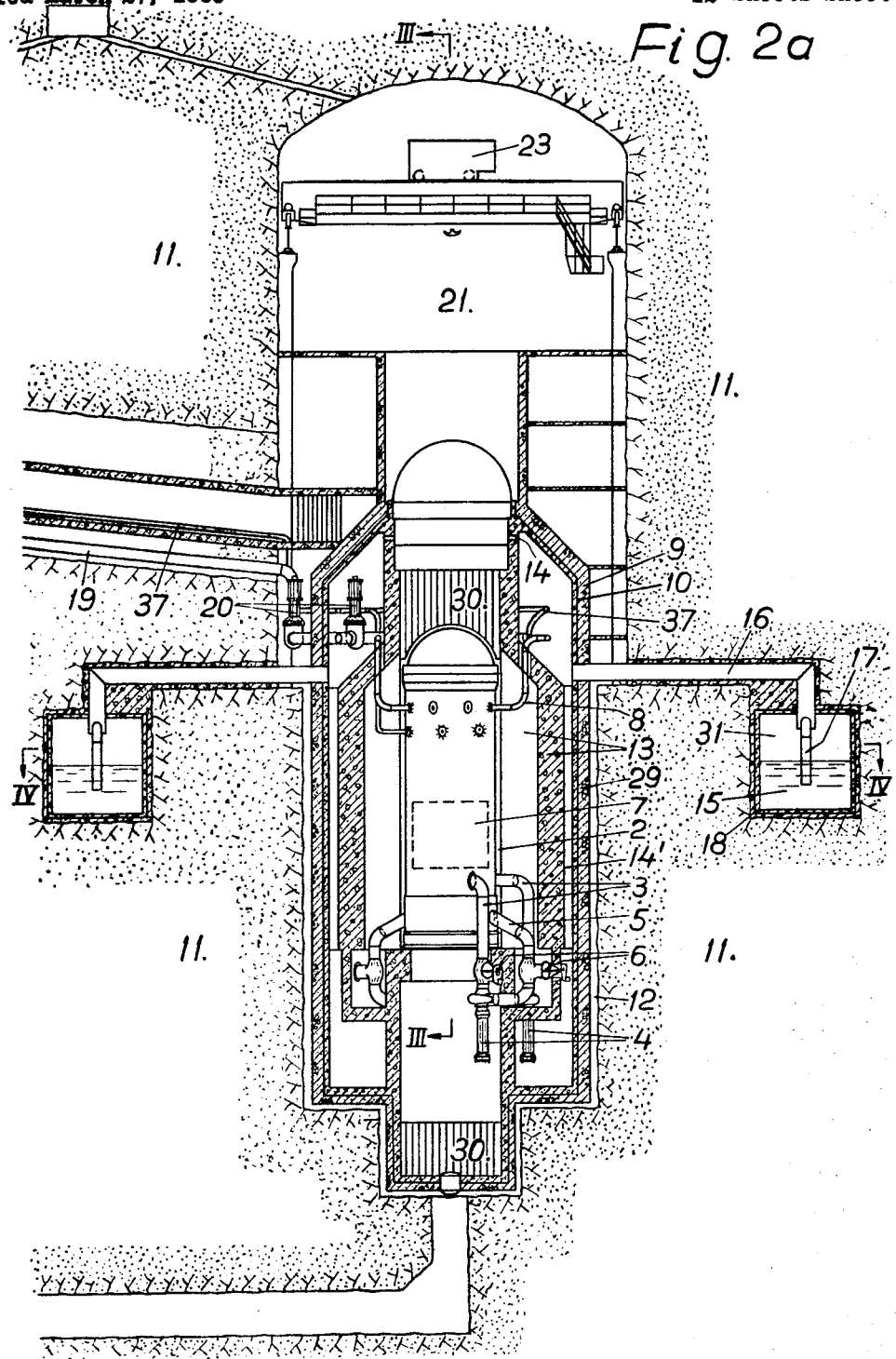
Figure 4:
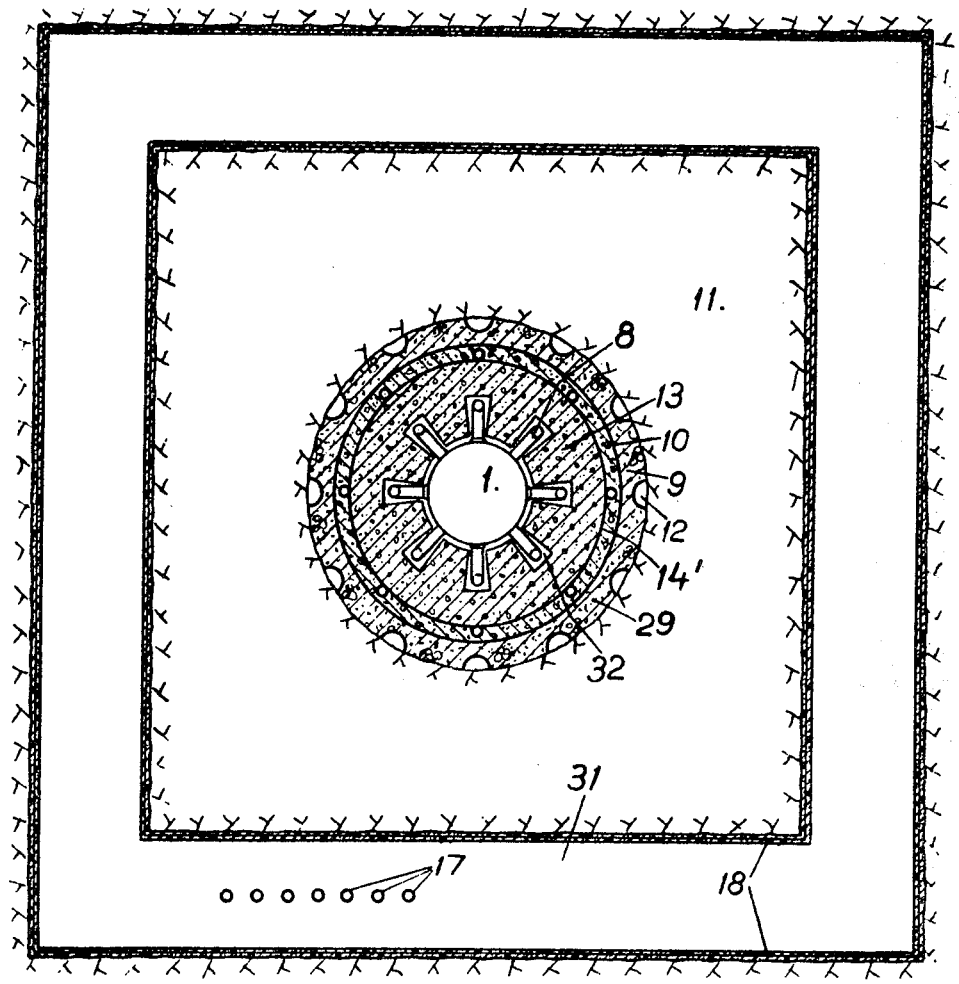
FIG. 4 shows the section IV—IV in FIGS. 2 and 3.

The reactor 1 shown in FIGS. 1–4 is a so-called direct cycle boiler with saturated light-water steam, internal steam separation and forced circulation. From the bottom part of the reactor pressure vessel 2 lead four wide pipe fittings 3 to the inlets of circulation pumps 4, the outlets of which through pipe fittings 5 are connected to the reactor vessel 2. The pipe fittings 3 and 5 are provided with valves 6. At the bottom of the reactor pressure vessel are about 110 pipe connections (not shown) for connection to a corresponding number of driving means for control rods (not shown), which are inserted into the reactor core 7 from below. The reactor core is built up of fuel rods collected in about 450 fuel assemblies, each having 8 x 8 rods. The fuel rods consist of uranium dioxide pellets in canning tubes of Zircaloy 2. Guide tubes for the control rods are arranged between the core bottom and the pipe connections, which guide tubes are preferably designed according to Swedish Pat. No. 227,146. Above the core 7 inside the reactor pressure vessel 2 are steam separators and steam driers, preferably of the type described in French Pat. No. 1,554,253. Four to eight steam pipes 8 lead from the upper part of the reactor pressure vessel 2. The above described reactor may have the principal data as indicated in Table 1.

TABLE 1

Principal data of the reactor

| | | |
|---|---|---|
| Electric power, net | mw | 400 |
| Electric power, gross | mw | 420 |
| Power factor | | 0.8 |
| Thermal power | mw | 1246 |
| Total thermal efficiency | percent | 32.1 |
| Operating pressure in reactor | bar | 70 |
| Pressure at turbine regulator valve | bar | 68 |
| Steam temperature | ° C | 283 |
| Steam flow | kg./s | 583 |
| Circulation number | | 10 |
| Circulation flow | kg./s | 5830 |
| Temperature of feed water | ° C | 160 |
| Temperature of cooling water | ° C | 7.5 |
| Reactor pressure vessel: | | |
|   Height | m | 17 |
|   Diameter | m | 5.0 |
|   Weight | t | 400 |
|   Wall thickness | mm | 120 |
| Core height | mm | 3650 |
| Diameter of fuel pellets | mm | 10.5 |
| Thickness of canning tube | mm | 0.8 |
| Maximum thermal load at nominal power | w./cm.$^2$ | 100 |
| Absorber material in control rods | | $B_4C$ |
| Fuel weight | kg. U | 80450 |
| Average burn-up in equilibrium core | m.w./ton U | 22000 |

As is seen from FIG. 2a, the reactor is surrounded by a primary containment vessel 9, made of reinforced concrete. A metal membrane 10 embedded in the concrete provides sufficient tightness for the primary containment vessel 9 which is also pre-stressed, at least where it is not supported against the surrounding rock 11 (see FIG. 4). The wall of the primary containment vessel 9 is provided with axial channels 12 to ventilate and drain the rock cavern. The concrete layer 29 between the sealing metal sheet 10 and the rock wall 11 consists of porous, so-called "popcorn" concrete. "Popcorn" concrete and its properties is further described in three articles in Journal of the American Concrete Institute, in vol. 28, No. 4, October 1956, pages 375–382; vol. 21, No. 6, February 1950, pages 477–479; and vol. 22, No. 10, June 1951, pages 833–846. As can be seen from these articles, "popcorn" concrete has high strength and a porosity of between 20 and 40%, but in contrast to ordinary lightweight concrete the void spaces are inter-connected, thus permitting the diffusion of gas and liquid through the concrete.

Between the wall of the primary containment vessel 9 and the reactor tank 2 is a non-tight concrete shield 13 which forms a radiation shield and also protects the tight primary containment vessel 9 against the missiles and high shock pressure which may be caused by serious ruptures in the primary reactor system. Due to expansion joints 14 and 14', respectively, between the top of the concrete shield 13 and the primary containment vessel 9 and between the side walls of the concrete shield 13 and the primary containment vessel side walls 9, the concrete shield can expand freely inside the primary containment vessel during normal operating conditions for the reactor. The vessel 9 thus encloses a first reception space on the outside of and above and below the shield 13. The concrete shield 13, which has substantially the shape of a hollow cylinder with axial slots 32 (see FIG. 4), is provided above and below the reactor with deformable shock-absorbing members 30, for example of the type indicated in Swedish Pat. No. 223,575. The distance between the insulation surrounding the reactor pressure vessel 2 and the upper shock-absorber 30 is made as small as possible as is the distance in radial direction between the concrete shield 13 and vessel 2.

The primary containment vessel 9 is provided with a so-called pressure-suppression system or condensing system to condense steam liberated at an accident. In the embodiment shown water is used as condensing medium, in an annular condensation basin 15 arranged in a separate rock cavern 31 and connected to the primary containment vessel 9 by a number of conduits 16 which branch out into distribution tubes 17.

The condensation basin 15 is lined with concrete and provided with tight metal sheet 18 embedded in the concrete. The condensation system is arranged at such a height above the core 7 that the primary containment vessel 9 can be flooded to a level above the core without there being any risk of flooding the condensing system.

The steam conduits 8 leading from the upper part of the reactor pressure vessel 2 are joined together into one to four main steam pipes 19 before they pass through the primary containment vessel wall 9 to an external consumption point. On both sides of the wall 9 the main steam pipes 19 are provided with rapidly closing so-called isolation valves 20 to isolate the primary containment vessel upon an accident.

As mentioned previously the primary containment vessel 9 is located in a rock cavern 21 in such a way that the rock cavern forms a secondary containment for the components surrounded by the primary containment vessel, and forms a second reception space which is external of and thus of greater volume than the first reception space.

A fuel basin 22 is arranged in the rock cavern 21, that basin resting on the concrete shield 13 in an embodiment of the primary containment vessel which is not shown, so that the weight of the fuel basin 22, which may reach several thousand tons, prevents the shield 13 from lifting the primary containment vessel 9 upon an accident necessitating axial support. Further, equipment 23 is arranged in the rock cavern 21 in order to enable refuelling.

The steam generated in the reactor 1 is passed through the main steam pipe 19 to a turbine plant 24 to generate electric current and a heat exchanger 35 to generate hot water for district heating situated in a separate part 21' of the rock cavern 21. For the sake of simplicity this separate part of the rock cavern will here be called the turbine hall. FIG. 2b shows an end view of one of the two turbine plants 24 in the turbine hall. Each turbine plant 24 comprises a turbine part 33 with a generator 33' and a condensor part 34. Counter-pressure steam from the turbine part 33 is also conducted to the heat exchanger 35 to generate hot water for district heating. Condensate from the condensor part 34 and the heat exchangers 35 is pumped as feed water back to the reactor 1 through the feed water conduit 37 by the feed water pumps 36. The rock walls of the turbine hall 21' form a primary containment for the part of the primary system which is located in the turbine hall.

Figure 6:
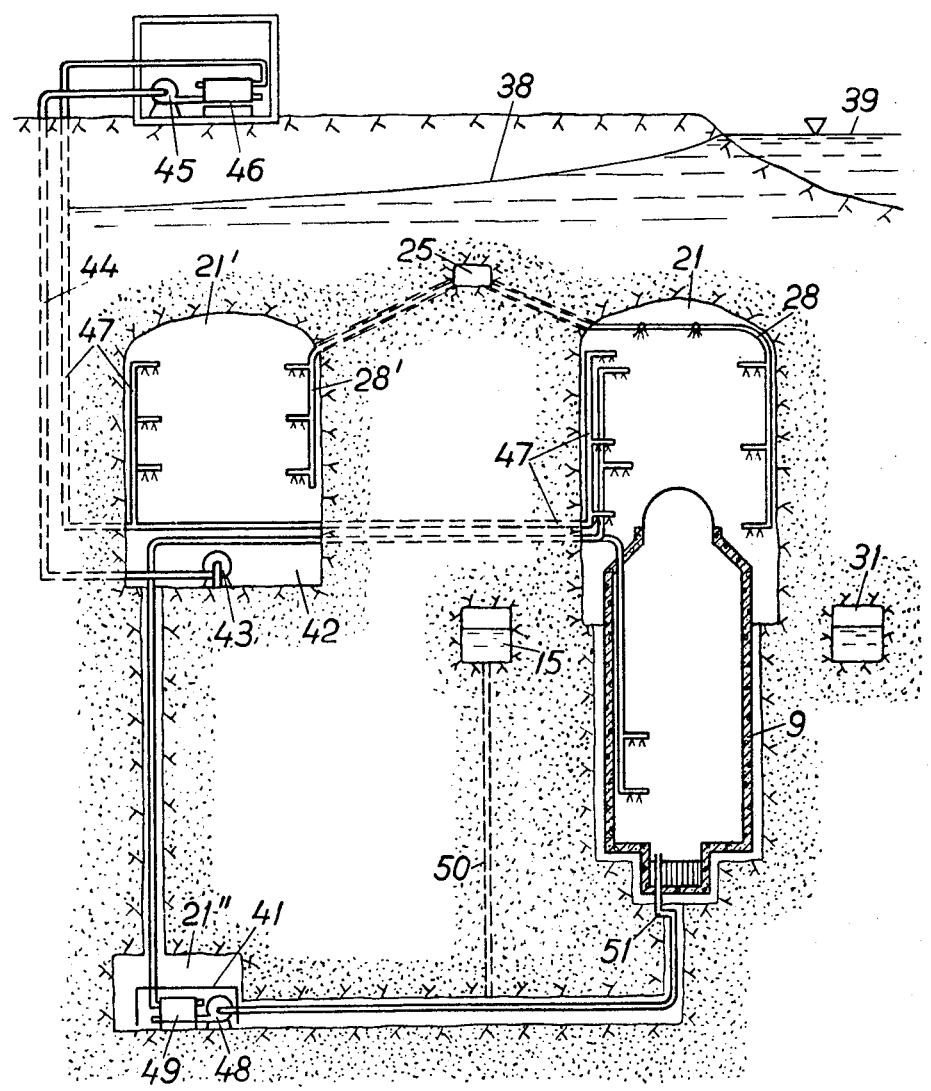
FIG. 6 shows schematically various sprinkling systems of the station and FIG. 7 the ventilation of the rock cavern.
Figure 9:
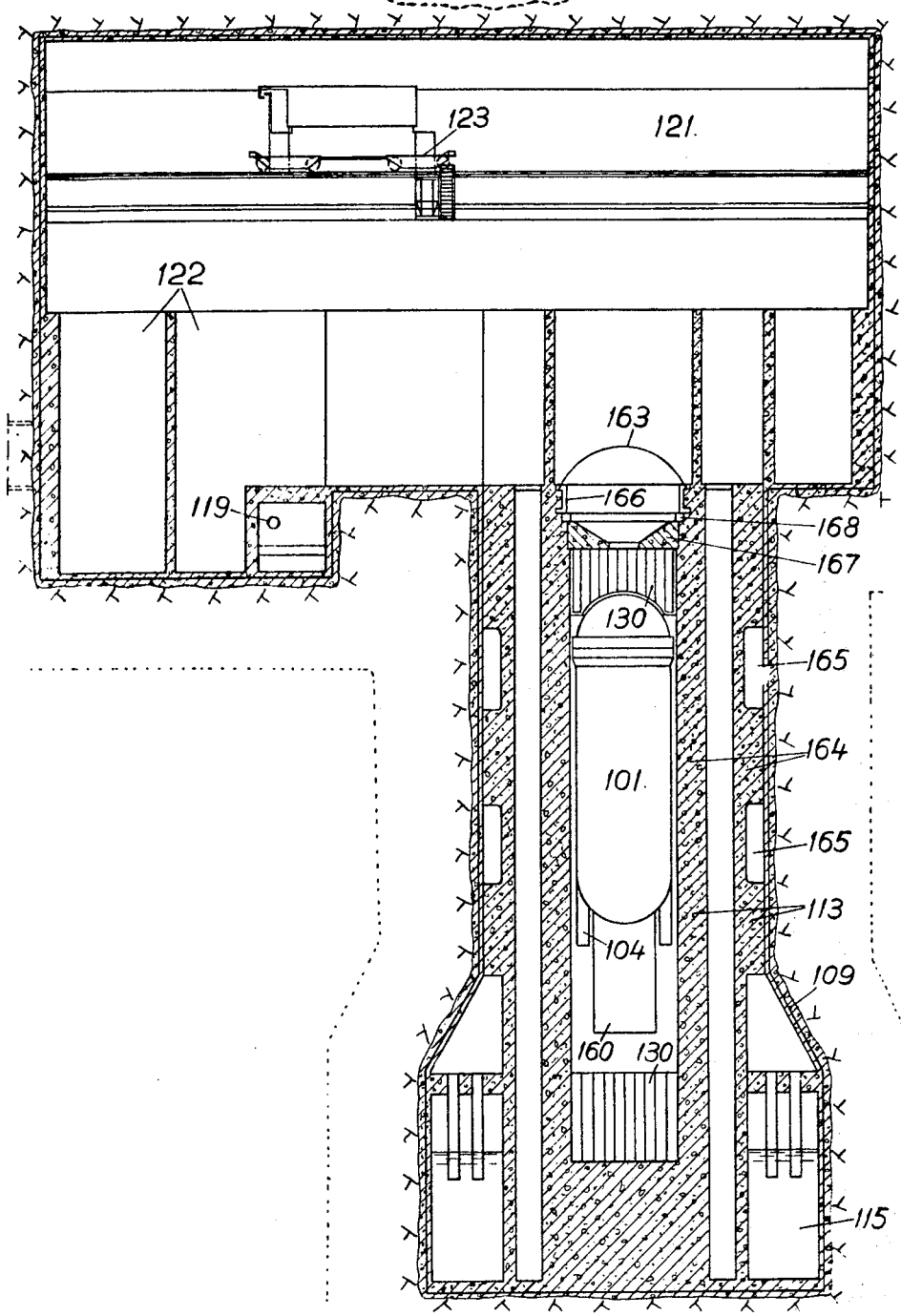
FIG. 9 shows the section IX—IX in FIG. 8 and FIGS. 10 to 18 show sections X—X to XVIII—XVIII in FIG. 8.
Figure 10:
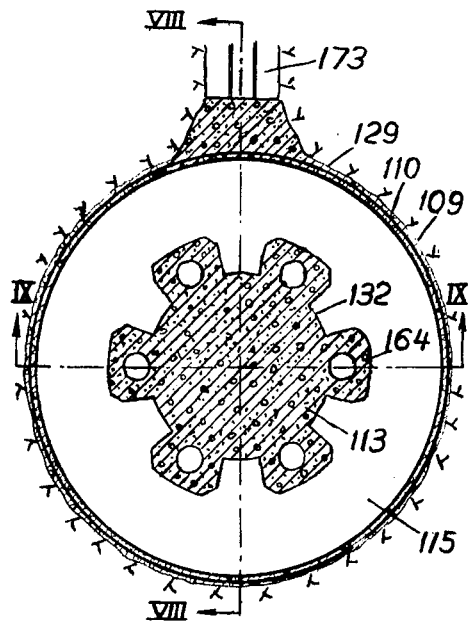
Figure 11:
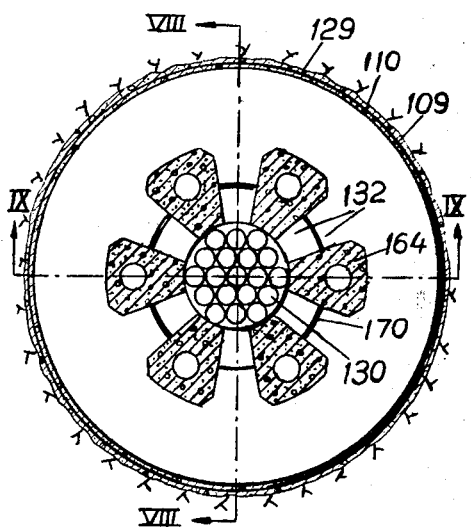
Figure 12:
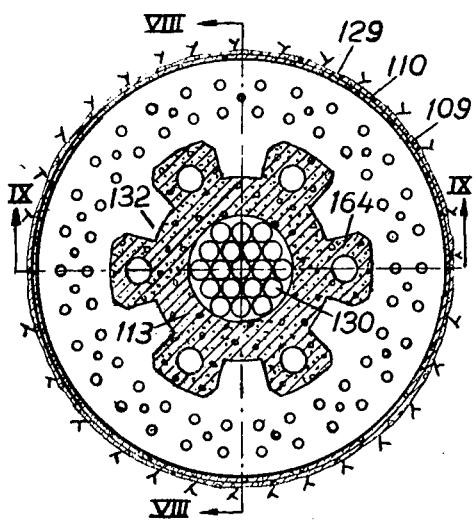
Figure 13:
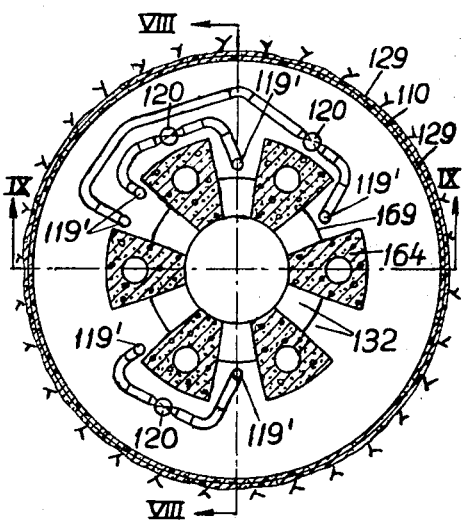

In order to achieve sufficient tightness against leakage from the rock cavern it may be necessary to inject the walls with a sealing substance to a depth of, for example 5 metres. A suitable value for permissible leakage is 10 m.$^3$ normal volume (calculated at 0° C. and 1 bar) per second and per bar over-pressure or less, but a value up to 100 can be accepted. The sealing substance preferably consists of a water slurry of a fine-grained material such as cement or fine-grained clay. By locating the rock caverns 21 and 21' below the ground water level 38, the ground water will be made to form a third containment. If the ground water level 38 should be too low, it can be raised artificially by supplying water from a basin or natural water body 39, as seen in FIG. 6. Tightly injected areas are indicated in the figures by dotted lines. A drainage pump 40 to tap off water which leaks through the tightly injected zone into the rock caverns 21 and 21', is arranged in a tunnel connected to the rock caverns by shafts leading upwards. The drainage pump 40 may be drownable or, as shown in FIG. 2b, located under a tight lid 41 below which there is permanently a gas pocket.

The rock cavern is ventilated but the air flow is kept low by extensive use of water-cooled air-temperators and wall arrangements. Thus the values in the shaft leading out of the rock cavern can be made small, which in turn makes it possible to check to a sufficient degree that these valves close to the required tightness.

The rock cavern is provided with a sprinkling system to condense steam which may have leaked out upon an accident. The water sprinkling can be carried out by means of pumps, but is suitably done by gravity from a water supply situated above the rock cavern and consisting of sprinkle-water basins arranged in the rock or at ground level. The sprinkle water may also be taken from a natural water supply such as the sea or the like.

A suitable, automatically starting sprinkling system is shown in FIG. 5. The sprinkle-water basin 25 is here located in the rock and is divided by the wall 26 into a part by the outlet and a part inside. The two parts of the basin communicate with each other at the bottom. A siphon 27 is arranged is the inner part of the basin, the top part of the siphon being above the normal water level in the basin 25. A sprinkle-water conduit 28 leads from the siphon 27 to the rock cavern 21. If the pressure in the rock cavern 21 should increase as a result of steam which has leaked out due to an accident, the increasing pressure will flood the siphon 27 and initiate sprinkling. The sprinkling continues until the basin 25 is emptied or as long as this is refilled.

The lower part 42 of the turbine hall 21' is suitably arranged to form a collecting basin for the sprinkle water. In an embodiment which is not shown the sprinkle water can be pumped from this collecting basin 42 back to the sprinkle-water basin 25 by sprinkle-water pumps, and and passing through heat exchangers to cool the sprinkle water. These pumps and heat exchangers may with advantage be located above ground.

FIG. 6 shows an embodiment of the invention in which the sprinkle water supplied to the turbine hall 21' through the conduit 28' is collected in the collecting basin 42, from whence it is pumped by the sprinkle-water pump 43 to ground level through the conduit 44. With another sprinkle-water pump 45 the pressure is increased and the sprinkle water is returned after cooling in a heat exchanger 46, through the conduit 47 to the rock cavern for continued sprinkling.

As can be seen in FIG. 6, the primary containment vessel 9 is also provided with a sprinkling and flooding system which may likewise comprise sprinkle pumps 48 and heat exchangers 49. The sprinkle water can be taken from the condensing basin 15 through the conduit 50 or from the primary containment vessel 9 through conduits 51 at the bottom and, in an embodiment not shown, from the sprinkle-water basin 25 or, for example, from the sea by means of gravity.

Preferably the sprinkle pumps 48 and heat exchangers 49 are located in a separate part 21" of the rock cavern, this part being arranged so that it cannot be flood by ground water leaking into the rock cavern or by sprinkle water, for example the pumps 48 and heat exchangers 49 may be located below the previously mentioned cap 41.

The condensors 34 in the turbine hall 21' are provided with an off-gas system which has a part delaying the radioactive components. This part is designed with long delaying time so that the radioactivity will have time to decay and the release to the surrounding will be low. Thus the radioactivity of this delaying part will be high so that it must be carefully shielded. In the present case this part delaying the radioactive components is situated in a separate rock cavern in such a way that the rock forms a radiation protection shield. This separate rock cavern may also form a secondary containment for gases which may leak from the off-gas system. It is also possible to allow one of the other rock caverns of the nuclear power station, preferably the gas-filled space of the condensing system (15–18), to act as expansion space and secondary containment for any gases leaking from the off-gas system.

FIG. 7 shows how radioactive components are sucked off from the turbine condensors 34 by means of an ejector 52 to a decay vessel 53 arranged in the rock cavern 21". After passage of the filters 54 and 55 the gas sucked off is sufficiently pure to be released into the atmosphere through one of the station chimneys 57 with the fan 56. An alternative location 53' for the decay vessel 53 is indicated with dotted lines in the rock cavern 31 for the condensing basin 15. FIG. 7 also shows how an emergency ventilation system is arranged by means of the fan 58 to suck gases from the axial channels 12. The gases are introduced into the off-gas system described above, between the filters 54 and 55. Advantageously the control room of the station is located at ground level.

A modified embodiment of the nuclear power station according to the invention is shown in FIGS. 8a, 8b, 9 and 10 to 18. The nuclear reactor 101 differs from that previously described mainly in that the circulation pumps here consists of so-called reactor-internal pumps 104. With these the pump motor projects from the reactor pressure vessel 102, while the impeller operates inside the reactor in an annular gap between a moderator tank and the wall of the reactor pressure vessel 102. In this way the risk of a pipe rupture in the circulation system is eliminated.

The space taken up by the driving means for the control rods is designated 160. Six steam conducts 108 lead from the reactor pressure vessel 102 and are joined to form three wider pipes 119' which lead to a steam-collecting box, from which two main steam pipes 119 lead to each of the two turbines 133. A ventilation system comprises six servo-controlled safety valves 161 per downwardly-running conduit 119'. Only two valves 161 are shown. At least one of these opens at a lower pressure than the others to blow the steam down to the condensing basin 115 of the primary containment 109.

The tight metal sheet 110 of the primary containment vessel 109 in this embodiment surrounds the reactor hall 121 as well. These two spaces are separated from each other by means of a lid arrangement comprising the flat lids 162 and the cupola 163. The axial slots 132 of the concrete shield 113 break through the shield radially at three levels, see FIGS. 11, 13, 14 and 16, so that at these levels columns 164 have sector shaped cross sections. Two annular peripheral channels 165 prevent the formation of shock waves due to reflection. The cupola 163 is sealingly attached to an upper steel ring 166 which, through pre-stressing cables in the columns 164, is anchored in the rock below the condensing basin 115. Upon a rupture in the reactor pressure vessel 102, its lid might become a missile which accelerates upwards. The lid is then caught by the upper shock-absorbers 130 which are then defomed. The impact force is taken up by a metal-lined concrete ring 167 which transmits the force through a dividable steel ring 168 to the upper steel ring 166. The pressure in the primary containment vessel 102 when such an accident occurs may be calculated to exceed 5 to 10 bar at which pressure the flat lids are thrown off and the pressure relaxed. The lid arrangement (162, 163) shown has been designed in such a way that the risk of its components forming missiles which may damage the sealing metal sheet in the reactor hall 121 has been minimised. If a tube ruptures, however, the lid arrangement will continue sealing. With such a smaller rupture steam which has been released under the reactor 101 will pass up through channels 171 and be deflected 180° towards the condensing basin 115. Upon a more serious rupture the steam will, however, burst two metal sheaths 169 and 170 arranged between the columns 64 and thus reach the condensation basin 115 more rapidly. The tight metal sheet 110 in the turbine hall 121 is extended to a concrete plug 172 which blocks the communication between the reactor hall and the turbine hall. In this way the turbine hall 121' may be said to form a third containment for the reactor 101.

Between the tight metal sheath 110 and the surrounding rock is "popcorn" concrete 129 as before. Alternatively, tightly packed stone material or normal concrete with drainage pipes cast in may be used. When the drainage tubes are cast in it is suitable to surround them with rockwool or some similar porous material.

Due to the open construction of the concrete shield 113 it is suitable to arrange extra radiation shields of a type which cannot give rise to dangerous missiles. Such radiation shields may, for example, consist of thin-walled metal vessels which are filled with water when radiation protection is necessary so that servicing can be carried out.

In a pump tunnel 172 leading from the condensing 115 and connected by a shaft to the turbine hall 121', there are, inter alia, sprinkle pumps, drainage pumps and a cooling system to keep the water in the condensing basin 115 at a low temperature. The sprinkle pumps may take water both from the condensing basin 115 and from a space below the reactor 101. The sprinkling system enables sprinkling of both the primary containment vessel 109 and the reactor hall 121 as well as the turbine hall 121'. The previously mentioned steel sheaths 169 and 170 provide a means of flooding the reactor 101 without the condensing system being put out of action.

The pump tunnel 173 is sealed on the other side of the shaft to the turbine hall 121' by a concrete plug 174 and continues as the off-gas tunnel 175. The off-gas tunnel corresponds to the previously-described decay vessel. Several intermediate walls 176 having small openings provide a long transport path and long delaying time with minimum mixing.

We claim:

1. A nuclear power station comprising a nuclear reactor having a reactor pressure vessel enclosing fuel rods and a cooling medium, a concrete radiation shield surrounding said reactor pressure vessel, a pressure-tight primary containment vessel having a cylindrical side wall, which surrounds all parts of the reactor pressure vessel, and a substantially pressure-tight secondary containment vessel, said primary containment vessel enclosing said reactor pressure vessel, said radiation shield and a first reception space which is disposed outside of the reactor pressure vessel for the accumulation of cooling medium leaking out from the reactor pressure vessel, the volume of said first reception space being greater than the volume of the reactor pressure vessel, said secondary containment vessel enclosing the primary containment vessel and enclosing a second reception space, which is outside of said primary containment vessel for accumulating cooling medium leaking out from said primary containment vessel, the volume of said second reception space being greater than the volume of said first reception space, wherein rock chamber means constitute said secondary containment vessel and include part of a pressure shock protecting means for said cylindrical side wall, said rock chamber means having a recess therein constituting part of the second containment vessel, the recess having a rock wall arranged adjacent the cylindrical side wall of the primary containment vessel with a space therebetween constituting a part of said second reception space a filling substantially filling the space between said rock wall and said cylindrical side wall, said rock wall having a circumferentially closed, substantially unbroken cylindrical surface, said rock wall and said filling constituting said pressure shock protecting means, said primary containment vessel comprising a body of concrete and a sealing metal sheet on the outside thereof and said filling comprising porous concrete, said power station having a water supply, wherein the water supply is located at a higher level than said rock chamber means, and means are provided for sprinkling said rock chamber means by gravity with water from the water supply.

2. The nuclear power station of claim 1, wherein said primary system comprises heat exchanging means arranged outside said primary containment vessel, said rock chamber means constituting a primary containment vessel for said heat exchanging means.

3. The nuclear power station of claim 2, wherein said rock chamber means comprises two separate caverns, a first cavern constituting said secondary containment vessel for said reactor and a second cavern constituting said primary containment vessel for said heat exchanging means.

4. The nuclear power station of claim 1, wherein said means for sprinkling comprise at least one siphon means, and means responsive to an accident developing an overpressure in said rock chamber for causing flooding by said siphon means, said flooding starting said sprinkling automatically.

5. The nuclear power station of claim 3, wherein means are provided for sprinkling said rock caverns with water from at least one water supply, said second cavern having a lower part constituting a collecting basin for at least part of said sprinkled water.

6. The nuclear power station of claim 5, wherein said sprinkling means comprise means for continued sprinkling with sprinkled water from said collecting basis, said means comprising heat exchanger means and sprinkle-water pump means located at ground level.

7. The nuclear power station of claim 1, having a water supply, wherein means are provided for taking water from the water supply, sprinkling it inside said primary containment vessel for said reactor and returning it to said supply, said means comprising heat exchanger means and sprinkle-water pump means located in a detached part of said rock chamber.

8. The nuclear power station of claim 1, wherein a radiation protecting and missile protecting, non-leaktight shield surrounds said reactor and is positioned between said reactor pressure vessel and said primary containment vessel side wall, said shield having during normal reactor operation a radial and axial margin of free movement in relation to said side wall of said primary containment, said shield upon an accident being radially directly supported by said primary containment side wall and thus indirectly supported by said rock chamber side wall.

9. The nuclear power station of claim 8, wherein deformable and impact-absorbing means are provided inside said primary containment vessel to protect it from missiles upon an accident which would cause objects to leave axially from the normal position of said reactor pressure vessel.

10. The nuclear power station of claim 8, wherein said shield at least substantially has the form of a hollow cylinder having axial slots.

11. The nuclear power station of claim 10, wherein said shield has radial openings and at least one circumferential channel, said channel preventing a build-up of shock waves by reflection.

12. The nuclear power station of claim 1, wherein said rock chamber means has walls, said walls including ceiling and floor, said walls having an at least substantially sealing zone comprising a sealing substance injected into said walls.

13. The nuclear power station of claim 12, wherein said sealing substance is a slurry of water and fine-grained material, said material being selected from cement and fine-grained clay.

14. The nuclear power station of claim 12, wherein rock saturated with ground water surrounds said rock chamber means and its sealing zone, said ground water constituting a third containment.

15. The nuclear power station of claim 14, wherein to keep said rock chamber dry means are provided for drawing off ground water leaking through said injected sealing zone.

16. The nuclear power station of claim 15, wherein means are provided to keep said ground water at a certain level, said last means comprising a body of water at ground level.

17. The nuclear power station of claim 1, wherein means are provided for ventilating and draining said rock chamber means, said means comprising at least one duct running axially between said primary containment vessel side wall and said rock chamber means side wall.

18. The nuclear power station of claim 1, wherein an outer layer of said primary containment vessel side wall comprises porous "popcorn" concrete having interconnected voids.

19. The nuclear power station of claim 1, wherein upon an accident said primary system is capable of liberating steam and means are provided for condensing said liberated steam, said condensing means comprising means forming a condensing space and a condensing medium in said space, said condensing space being connected to said primary containment vessel, said rock chamber means including a separate and tight rock cavern containing said condensing space, whereby a pressure rise in said condensing space is absorbed directly in said rock.

20. The nuclear power station in claim 19, wherein said reactor has a reactor core and said condensing means are arranged at a higher level than said core, whereby upon a flooding of said primary containment vessel with water said core will be flooded while said condensing means are still operative.

21. The nuclear power station of claim 19, comprising an off-gas system, said system comprising means detaining radioactive substances, said means being located in said rock cavern, said rock constituting a radiation shield and said rock cavern constituting a secondary containment for gases in said off-gas system.

22. The nuclear power station of claim 1 comprising an off-gas system, said system comprising means detaining radioactive substances, said rock chamber means including a separate rock cavern enclosing said system, said rock constituting a radiation shield.

23. The nuclear power station of claim 22, wherein said rock cavern forms a secondary containment for gases in said off-gas system.

24. The nuclear power station of claim 12, wherein said sealing zone has such a tightness that an overpressure in said chamber means developing upon an accident causes a leakage per bar over-pressure and per second, which is less than 1000 cubic metres when reduced to 0° C. and 1 bar.

References Cited

UNITED STATES PATENTS

| | | | |
|---|---|---|---|
| 3,453,176 | 7/1969 | Edling | 176—37 |
| 3,021,273 | 2/1962 | Dix | 176—40 |
| 3,056,736 | 10/1962 | Went et al. | 176—37 |
| 3,089,834 | 5/1963 | Madsen | 176—52 X |
| 3,158,546 | 11/1964 | Cordova | 176—37 |
| 3,168,445 | 2/1965 | Ziegler et al. | 176—38 |
| 3,207,671 | 9/1965 | Kornbichler | 176—38 |
| 3,232,843 | 2/1966 | Went et al. | 176—38 X |
| 3,236,739 | 2/1966 | Lange et al. | 176—DIG. 2 |
| 3,438,857 | 4/1969 | Sulzer | 176—87 X |
| 3,475,272 | 10/1969 | Fortescue et al. | 176—38 X |

OTHER REFERENCES

Second U.N. Conference on Atomic Energy, vol. 11, 1958, pp. 101–106, by Carlbom et al.

Nuclear Power, vol. 8, 1963, pp. 37–50.

Third U.N. Conference on Atomic Energy, vol. 5, 1964, pp. 411–418 and 431–437.

Third U.N. Conference on Atomic Energy, vol. 13, 1964, pp. 363–369 and 411–419.

Euro Nuclear, vol. 3, No. 1, January 1966, pp. 37–40.

CARL D. QUARFORTH, Primary Examiner

H. E. BEHREND, Assistant Examiner

U.S. Cl. X.R.

176—38, 87